May 15, 1923. 1,454,844
J. P. CAMPBELL
IRRIGATING DEVICE
Original Filed April 6, 1920  2 Sheets-Sheet 1
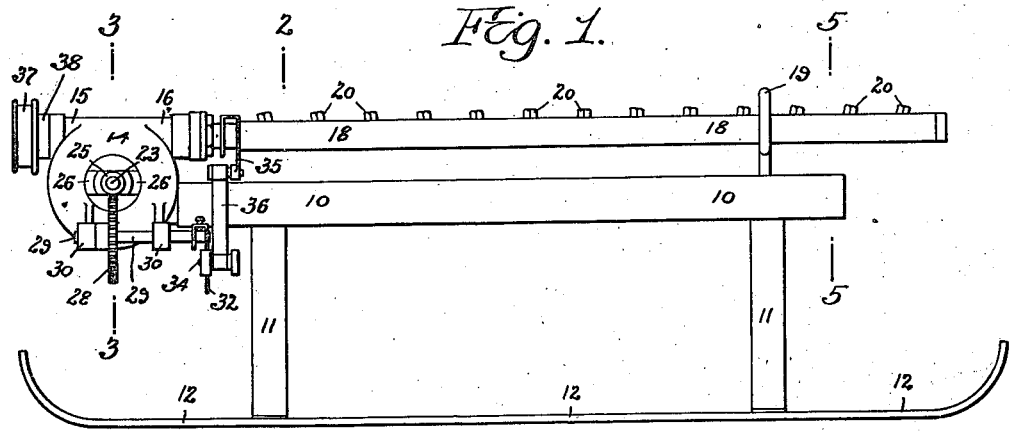
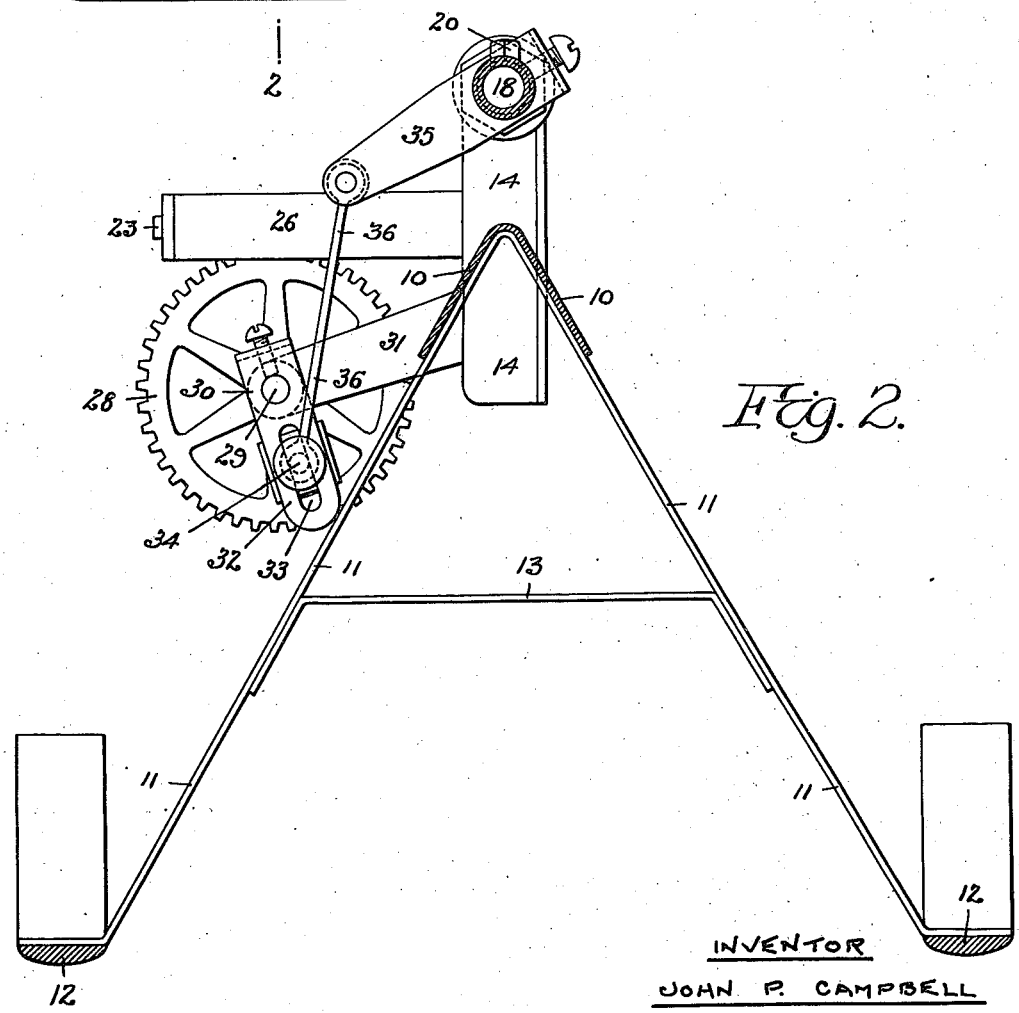
INVENTOR
JOHN P. CAMPBELL
BY HIS ATTORNEY Harry Smith May 15, 1923.
J. P. CAMPBELL
IRRIGATING DEVICE
Original Filed April 6, 1920 2 Sheets-Sheet 2
1,454,844
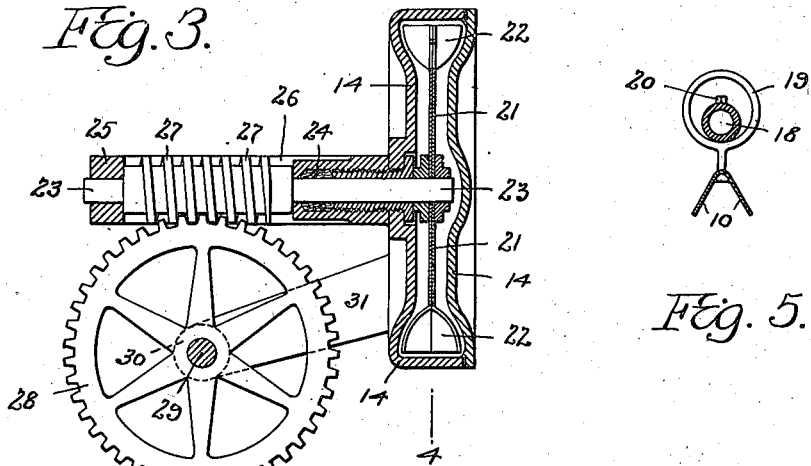
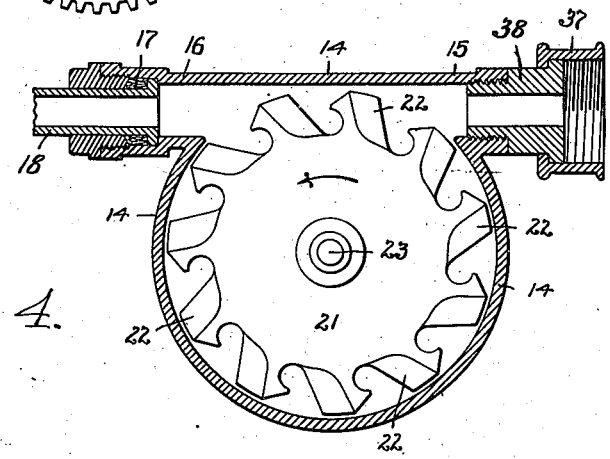
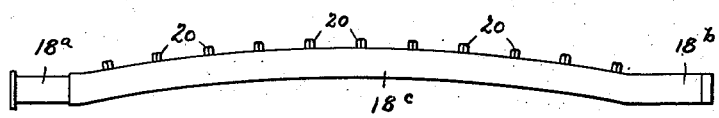
INVENTOR
JOHN P. CAMPBELL
BY HIS ATTORNEY Harry Smith Patented May 15, 1923.

1,454,844

UNITED STATES PATENT OFFICE.

JOHN P. CAMPBELL, OF WOODBURY, NEW JERSEY, ASSIGNOR, BY MESNE ASSIGNMENTS, TO MALCOLM C. LUDLAM, OF WOODBURY, NEW JERSEY.

IRRIGATING DEVICE.

Application filed April 6, 1920, Serial No. 371,667. Renewed March 2, 1923.

*To all whom it may concern:*

Be it known that I, JOHN P. CAMPBELL, a citizen of the United States, residing in Woodbury, New Jersey, have invented certain Improvements in Irrigating Devices, of which the following is a specification.

My invention relates to that class of irrigating devices usually referred to as lawn or garden sprinklers, the object of my invention being to construct a device of that type in such a way that it will be small and compact in size, light in weight yet strong and durable in construction and have its discharge nozzles so disposed that it will sprinkle over a relatively large area so that much ground may be covered with but few changes in position of the device. This object I accomplish in the manner hereinafter set forth, reference being had to the accompanying drawing, in which Fig. 1 is a side view of an irrigating device constructed in accordance with my invention;

Fig. 2 is an enlarged transverse sectional view of the same on the line 2—2, Fig. 1;

Fig. 3 is an enlarged transverse sectional view on the line 3—3, Fig. 1;

Fig. 4 is a longitudinal sectional view on the line 4—4, Fig. 3;

Fig. 5 is a transverse sectional view on the line 5—5, Fig. 1, and

Fig. 6 is a side view of one element of the device but of modified construction.

Referring to the drawings, my invention embodies a supporting structure comprising a longitudinal frame 10 mounted upon diverging legs 11 the lower ends of which are mounted upon longitudinal runners 12. Rigidity may be imparted to each pair of legs 11 by means of a transverse brace 13.

Suitably secured to one end of the frame 10 is the casing 14 of a water motor, the operation and purpose of which will be hereinafter described. This casing is provided with an inlet branch 15 and an outlet branch 16, the latter providing, within a stuffing box 17, a bearing for an oscillatory distributing pipe 18 which is disposed above and in line with the longitudinal frame 10. The outer end of this frame carries an upstanding ring 19 through which the outer end of the distributing pipe 18 passes and which serves as a bearing therefor.

The distributing pipe 18 is provided, at intervals, with discharge nozzles 20, and, in order that the streams therefrom may be distributed over the greatest possible area, these nozzles are so disposed that the streams they throw will diverge, each from those adjacent. One way to effect this is to have the nozzles radiating from a common center. The divergence, however, need not be radial, if such is not desired.

The purpose of the water motor hereinbefore referred to is to oscillate the distributing pipe 18 so that the streams thrown from the nozzles will sweep to and fro from one side of the device to the other, thereby sprinkling a much larger area than if the nozzles remained stationary. The manner in which the oscillation of the pipe 18 is effected is as follows: Rotatably mounted within the casing 14 is a disk or wheel 21, the outer or peripheral portion of which is provided with a series of cups or pockets 22, the upper run of which carries them between the inlet branch 15 and outlet branch 16 of the casing 14, so that passage of water from the inlet to the outlet branch on its way to the distributing pipe 18 will cause the wheel 21 to revolve. This wheel is mounted upon a transverse shaft 23 which passes through a stuffing box 24 located at one side of the casing 14, the outer end of this shaft being mounted in a bearing 25 formed at the ends of arms 26 projecting from the casing 14. The shaft 23 is provided with a worm 27 which intermeshes with a worm wheel 28 secured to a longitudinal shaft 29 rotatably mounted in bearings 30 formed at the ends of arms 31 which also project from the casing 14.

Secured to the outer end of the shaft 29 is a crank arm 32 having a slot 33 for the reception of a crank pin 34 which is adjustably mounted therein.

Secured to the distributing pipe 18 at a point adjacent its bearing in the stuffing box 17 is a projecting arm 35, the outer end of which is connected, by means of a link 36, with the crank pin 34 on the crank arm 32.

Rotation of the wheel 21 by the flowing water rotates the shaft 29 through the medium of the worm 27 and worm wheel 28 and the resultant rotation of the crank arm 32 oscillates the arm 35, by means of the link 36, with consequent oscillation of the distributing pipe 18.

Adjustment of the crank pin 34 in the slot 33 varies the throw of the crank with corresponding variation in the oscillation of the distributing pipe. The width of the area that will be sprinkled is thereby determined.

Preferably, the crank arm 32 is adjustably mounted upon the shaft 29 and the arm 35 is correspondingly adjustably mounted upon the distributing pipe 18. Adjustment of these arms controls the direction in which the nozzles 20 are directed and by means of the adjustment sprinkling can be effected upon either side of the device or upon both sides, as desired.

Water is supplied to the inlet branch 15 of the motor casing by means of a pipe or hose, and the inlet branch is provided with a conventional union 37 for the reception of such pipe or hose. When a flexible hose is used, the device may be readily moved from place to place without the necessity of disconnecting the hose or even shutting off the water supply. Such movement may be effected either by pulling the hose or by means of a rope fastened to any convenient portion of the supporting structure and of such length as to clear the farthest reaching stream from the discharge nozzles. In order to permit movement of the device over lawns without cutting the turf, the runners 12 are preferably convex upon their under faces and have their ends turned up.

By preference, the union 37 is carried by a nipple 38 screwed into the inlet branch 15 of the water motor. The use of nipples of various bores serves to control and determine the velocity with which the incoming water will strike the pockets 22 of the water wheel.

In Fig. 6 is shown a distributing pipe of modified construction. In this instance, the inner and outer ends 18$^a$ and 18$^b$ are in line, axially, in order that they may properly engage the supporting bearings, but the intervening portion 18$^c$ which carries the discharge nozzles 20 is formed on an arc of a circle with the nozzles radially disposed. This construction may, if desired, be used, but the straight distributing pipe is to be preferred for the reason that its weight is equally distributed about its axis of oscillation.

Certain novel features of construction of the water motor which are shown in the drawings but not specifically described in detail, nor claimed, I reserve to myself as subject matter for a later application for Letters Patent.

I claim:

In an irrigating device, in combination, a support comprising a horizontal member, downwardly diverging legs adjacent the ends thereof, skids connecting the ends of said legs upon which the device may be moved, a water motor casing carried by said member at one end thereof, said casing having a tangential water supply passage, a distributing pipe revolubly connected to the outlet of said passage forming an extension thereof and mounted on said support and connection whereby said motor is adapted to cause oscillation of said pipe.

In testimony whereof, I have signed my name to this specification.

JOHN P. CAMPBELL.